US006565952B1

(12) United States Patent
Ishikawa et al.

(10) Patent No.: US 6,565,952 B1
(45) Date of Patent: May 20, 2003

(54) INK-JET RECORDING SHEET

(75) Inventors: Takayuki Ishikawa, Shizuoka (JP); Shinichiro Kobayashi, Shizuoka (JP); Takeshi Yoshimoto, Shizuoka (JP); Nobuhiro Kubota, Shizuoka (JP); Kiyoshi Iwamoto, Shizuoka (JP); Jun Sugiyama, Nagano (JP); Hiroyuki Onishi, Nagano (JP); Yukari Sano, Nagano (JP)

(73) Assignees: Tomoegawa Paper Co., Ltd., Tokyo (JP); Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/720,989

(22) PCT Filed: Jul. 5, 1999

(86) PCT No.: PCT/JP99/03619

§ 371 (c)(1),
(2), (4) Date: Jan. 3, 2001

(87) PCT Pub. No.: WO00/01535

PCT Pub. Date: Jan. 13, 2000

(30) Foreign Application Priority Data

Jul. 3, 1998 (JP) .......................................... 10-204467

(51) Int. Cl.$^{7}$ ................................................ B32B 3/00

(52) U.S. Cl. ....................... 428/195; 428/522; 428/523

(58) Field of Search ................................ 428/195, 500, 428/522, 523

(56) References Cited

U.S. PATENT DOCUMENTS

| | | | | |
|---|---|---|---|---|
| 4,294,939 A | * 10/1981 | Taniguchi et al. | .......... | 525/118 |
| 5,700,582 A | * 12/1997 | Sargeant et al. | ......... | 420/476.6 |

FOREIGN PATENT DOCUMENTS

| | | |
|---|---|---|
| JP | 1-188387 | 7/1989 |
| JP | 7-266686 | 10/1995 |
| JP | 8-192569 | 7/1996 |
| JP | 8-300807 | 11/1996 |

* cited by examiner

*Primary Examiner*—Bruce H. Hess
*Assistant Examiner*—Michael E. Grendzynski
(74) *Attorney, Agent, or Firm*—McDermott, Will & Emery

(57) ABSTRACT

The invention provides an ink-jet recording sheet having an excellent preventive effect on overall. degradation by light such as degradation of image clarity, and decrease in density or change of tone of images, and a resin composition for ink-jet recording media used in the formation thereof. The recording sheet of the invention comprises a substrate and as an ink-receiving layer provided on the substrate, a layer containing an acrylic resin comprising, as copolymerizable monomers, (a) a dialkylaminoalkyl methacrylate, (b) acrylamide and (c) at least one monomer selected from among an. alkoxypolyethylene glycol methacrylate, a 2-hydroxyalkyl methacrylate and a 2-hydroxyalkyl acrylate.

8 Claims, No Drawings

INK-JET RECORDING SHEET

TECHNICAL FIELD

The present invention relates to a material for recording paper, and more particularly to an ink-jet recording sheet which develops an excellent preventive effect on overall degradation by light such as degradation of image clarity, and decrease in density or change of tone by using it as an ink-receiving layer or glossy layer of ink-jet recording media, and a resin compositions for ink-jet recording media used in the formation thereof.

BACKGROUND ART

In recent years, ink-jet printers have been increasingly spread because they have such features that bright or clear recording is achieved, noises are little, and color images can be formed with ease.

The ink-jet printers require to use inks hard to dry for the purpose of preventing clogging of jet nozzles by drying of ink. As inks having such properties, there are generally used water-based inks in which a binder, a dye, a solvent, additives and the like are dissolved or dispersed in water. However, characters, images and/or the like formed in a recording medium by using such a water-based ink tend to cause degradation by light by room light (fluorescent lamp), direct sunshine or the like. Under the circumstances, the.characters, images and the like formed with the water-based ink are liable to undergo deterioration of image clarity, and decrease in density or change of tone-compared with prints with a pigment ink and silver salt photographs.

According as ink-jet printers have become cheaper, and the excellent definition or sharpness and coloration of images in the ink-jet printers have become close to one in recent years, strict requirements for light fastness and the like have been gradually enhanced.

Accordingly, under the circumstances, the perfect prevention of the overall degradation by light of these images now becomes an essential requisite to ink-jet recording media.

With the foregoing circumstances in view, investigations have been made as to the prevention of the degradation by, light of ink-jet recording media. For example, a great number of patents related to the fact that a metallic compound such as magnesiumoxide, magnesium carbonate, calcium oxide or calcium carbonate is added to an ink-receiving layer, thereby developing a preventive effect on degradation by light have been proposed. However, it has been found that the addition of these metallic compounds not only has no sufficient effect, but also brings a greater evil effect that the image clarity is degraded. As described above, the addition of the metallic compounds has a fear that the evil effect of degrading the image clarity becomes greater than the preventive effect on the degradation by light. However, the investigation as to this problem centers on additives to ink-receiving layers and the like under the circumstances, and an investigation as to resin compositions for ink-jet recording media having a preventive effect on degradation by light is not very made.

The general investigation as to the prevention of degradation by light of the ink-jet recording media is only made on room light, and any invention having a sufficient effect on overall degradation by light is not yet made.

Accordingly, the present invention has carried on investigations as to resin compositions for ink-jet recording media, and it is an object of the present invention to provide an ink-jet recording sheet having an excellent preventive effect on degradation by light such as degradation of image clarity, and decreasing in density or change of tone of an image, and a resin composition for ink-jet recording media, which is suitable for use in the formation of such a sheet.

DISCLOSURE OF THE INVENTION

The present inventors have carried out various investigations as to resin compositions for ink-jet recording media. As a result, it has been found that when a resin composition comprising a water-soluble acrylic resin synthesized under specified conditions is used in an ink-receiving layer of an ink-jet recording medium, the overall degradation by light such as degradation of image clarity, and decreasing in density or change of tone is extremely effectively prevented, thus leading to completion of the present invention.

An ink-jet recording sheet according to the present invention is characterized by comprising a substrate and as an ink-receiving layer provided on the substrate, a layer containing an acrylic resin comprising, as copolymerizable monomers, (a) a dialkylaminoalkyl methacrylate, (b) acrylamide and (c) at least one monomer selected from among an alkoxypolyethylene glycol methacrylate, a 2hydroxyalkyl methacrylate and a 2-hydroxyalkyl acrylate.

A resin composition for ink-jet recording media according to the present invention, which is used for formation of the ink-jet recording sheet described above, is characterized by comprising a solvent and an acrylic resin dissolved in the solvent and comprising, as copolymerizable monomers, (a) a dialkylaminoalkyl methacrylate, (b) acrylamide and (c) at least one monomer selected from among an alkoxypolyethylene glycol methacrylate, a 2-hydroxyalkyl methacrylate and a 2-hydroxyalkyl acrylate, wherein the solvent is a mixed solvent of water/alcohol.

BEST MODE FOR CARRYING OUT THE INVENTION

The preferred mode for carrying out the present invention will hereinafter be described.

The resin composition for ink-jet recording media according to the present invention serves to impart a preventive effect on degradation by light, such as degradation of image clarity, and decreasing in density or change of tone, to an ink-jet recording sheet by using it in the formation of an ink-receiving layer of such a sheet.

With respect to the acrylic resin contained in the ink-receiving layer of the ink-jet recording sheet according to the present invention, the raw materials, synthetic conditions and other various conditions will hereinafter be described.

(A) Raw Materials (monomers) of Acrylic Resin

The acrylic resin in the present invention is an acrylic copolymer synthesized by using, as raw materials, two monomers of a dialkylaminoalkyl methacrylate and an acrylamide as a component that is considered to impart miscibility with a pigment used in the ink-receiving layer and stability of a coating material to the resin, and at least one monomer selected from among an alkoxy-polyethylene ,glycol methacrylate, a 2-hydroxyalkyl methacrylate and a 2-hydroxyalkyl acrylate as a component that is considered to impart image clarity to the resulting acrylic resin.

Specific raw materials (monomers) of the acrylic resin will hereinafter be described.

No particular limitation is imposed on the dialkylaminoalkyl methacrylate that is considered to impart water solubility, miscibility with pigments and stability to the acrylic resin. However, examples thereof include dimethylaminomethyl methacrylate, diethylaminomethyl methacrylate, dimethylaminoethyl methacrylate, diethylaminoethyl methacrylate, dipropylaminomethyl methacrylate and dipropylaminoethyl methacrylate.

Among these monomers, dimethylaminoethyl methacrylate and diethylaminoethyl methacrylate are most preferred in view of points of the degree of water solubility (water resistance) of an ink-receiving layer comprising an acrylic resin synthesized therefrom as a binder, the degree of activity at an amino site taking prevention of degradation by light into consideration, the degree of miscibility with a pigment contained in the ink-receiving layer, and the like.

In the present invention, acrylamide is used in combination as a monomer for finely adjusting the water solubility of the resulting acrylic resin and lowering the copolymerization ratio of the dialkylaminoalkyl methacrylate as much as possible to prevent degradation by light.

No particular limitation is imposed on the alkoxypolyethylene glycol methacrylate that is considered to impart water solubility and transparency (i.e., clarity of a printed image) to the resulting acrylic resin. However, examples thereof include those having the following structural formula, and specific examples thereof include methoxypolyethylene glycol methacrylate, ethoxypolyethylene glycol methacrylate and propoxypolyethylene glycol methacrylate.

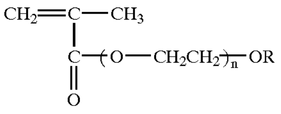

wherein R is an alkyl group, and n is a polymerization degree.

In these compounds, the alkyl group preferably has 1 to 3 carbon atoms. No particular limitation is imposed on the molecular weight of.the polyethylene glycol moiety. In the present invention, however, that having a molecular weight within a range of about 200 to 2,000, preferably about 500 to 2,000 is preferably used. If the molecular weight of the polyethylene glycol moiety is higher than 2,000, the water solubility of the acrylic resin synthesized is deteriorated, and the.resin becomes waxy, so that the image clarity is adversely affected. If the molecular weight of the polyethylene glycol moiety is lower than 200, the strength of the acrylic resin itself becomes weak, which forms the cause the strength of a layer formed from the resulting resin composition is decreased. Thus, the molecular weight must be at least 200 and is preferably at least 500. Accordingly, methoxypolyethylene glycol methacrylate, ethoxy-polyethylene glycol methacrylate or propoxypolyethylene glycol methacrylate having a molecular weight of about 1,000 is most preferred as a synthetic raw material of the acrylic resin.

As with the above, no particular limitation is imposed on the 2-hydroxyalkyl methacrylate that is considered to impart water solubility and transparency (image clarity) to the resulting acrylic resin. However, examples thereof include 2-hydroxymethyl methacrylate, 2-hydroxyethyl methacrylate and 2-hydroxypropyl methacrylate.

Among these compounds, 2-hydroxyethyl methacrylate is most preferred as a raw material from the viewpoints of the degree of water solubility and transparency (i.e., image clarity).

No particular limitation is also imposed on the 2-hydroxyalkyl acrylate. However, examples thereof include 2-hydroxymethyl acrylate, 2-hydroxyethyl acrylate and 2-hydroxypropyl acrylate.

Among these compounds, 2-hydroxyethyl acrylate is most preferred as a raw material from the viewpoints of the degree of water solubility and transparency (i.e., image clarity) of the resulting resin composition.

It is known to generally add a polymerization inhibitor to these raw materials for the purpose of preventing polymerization during storage. As the synthetic raw materials used in the resin compositions for ink-jet recording media according to the present invention, those containing the polymerization inhibitor in a proportion of less than 500 ppm, preferably less than 300 ppm, particularly preferably less than 200 ppm are preferably used.

(B) Synthetic Apparatus and the like

The above-described compounds are used as raw materials in combination to synthesize the acrylic resin used in the resin composition for ink-jet recording media according to the present invention. The polymerization apparatus, synthetic conditions and the like used in this case will be described.

<Polymerization Apparatus>

The acrylic resin used in the resin composition for ink-jet recording media according to the present invention can be synthesized by radical polymerization using a general water-soluble reaction solvent.

Accordingly, any polymerization apparatus and units may be used as polymerization apparatus for producing the acrylic resin according to the present invention so far as they are those generally used as synthetic devices for water-soluble resins. For example, reaction system-stirring apparatus, reaction temperature-controlling units, reflux condensers, dropping units for conducting a polymerization reaction in a two-liquid system, etc. are mentioned.

<Polymerization ratio>

When the acrylic resin for ink-jet recording media is synthesized by using the above-described compounds as raw materials, the dialkylaminoalkyl methacrylate and acrylic amide are used as main materials, and at least one monomer is optionally selected as a residual component from among the alkoxypolyethylene glycol methacrylate, 2-hydroxyalkyl methacrylate and 2-hydroxyalkyl acrylate to conduct copolymerization.

Since the light resistance of the acrylic resin synthesized is considered to be most affected by the copolymerization ratio of the dialkylaminoalkyl methacrylate which is an amino compound, the copolymerization ratio of the dialkylaminoalkyl methacrylate is preferably within a range of from 30% to 60%, more preferably from 35% to 50%, particularly preferably from 45% to 48% in terms of a weight ratio in view of the degree of water solubility of the resulting acrylic resin, the effect on improving the miscibility with pigments, and the like.

Taking the influence on light resistance into consideration, the copolymerization ratio of the dialkylaminoalkyl methacrylate in the acrylic resin is preferably lowered as much as possible. At this time, acrylamide is used in combination for the purpose of finely adjusting the degree of water solubility of the resulting acrylic resin and preventing the acrylic resin from lowering the miscibility with pigments. The copolymerization ratio (weight ratio) of acrylamide used in combination is preferably within a range of from 2% to 7%, more preferably from 3% to 5%, most preferably from 3.5% to 4.5%.

The copolymerization ratio of the alkoxypolyethylene glycol methacrylate, 2-hydroxyalkyl methacrylate and 2-hydroxyalkyl acrylate in the acrylic resin is preferably within the following range for the purpose of sufficiently developing performance as a resin composition for ink-jet recording media. Namely, when only the alkoxypolyethylene glycol methacrylate is used as the component (c), the copolymerization ratio thereof is preferably within a range of from 33% to 65%, more preferably from 40% to 60%, most preferably from 45% to 60%. When only the 2-hydroxyalkyl methacrylate or 2-hydroxyalkyl acrylate is used, the copolymerization ratio thereof is preferably within a range of from 33% to 55%, more preferably from 35% to 45%, most preferably from 35% to 40%. When at least two of these monomers are used in combination, the copolymerization ratio of the component (c) is 33 to 80% in total. In this case, the alkoxypolyethylene glycol methacrylate component is contained in a range of preferably from 5% to 65%, more preferably from 7% to 60%, most preferably from 45% to 55%. The 2-hydroxyalkyl methacrylate component and 2-hydroxyalkyl acrylate component are each contained in a range of preferably from 5% to 55%; more preferably from 15% to 45%, most preferably from 20% to 40%.

The respective monomers are combined so as to give the compositional ratios within the above respective ranges to control a copolymerization ratio, whereby an acrylic resin, which develops an excellent preventive effect on overall degradation by light such as degradation of image clarity, and decreasing in density or change of tone, can be synthesized.

<Polymerization Initiator>

As a polymerization initiator used upon the synthesis of the acrylic resin in the present invention, any generally-known radical polymerization initiator for water-soluble acrylic resins may be used. Specifically, the initiators can.be roughly divided into azo initiators and peroxide initiators. Examples of azo initiators usable include 2,2'-azobisisobutyronitrile (AIBN), 2,2'-azobis-2'-methylbutyronitrile (AMBN), 1,1'-azobis-1'-cyclohexane, carbonitrile (ACHN), dimethyl-2,2'-azobisisobutylate (MAIB), and 2,2'-azobis-(2-amidinopropane)-2 hydrochloride (ABAH). Examples of peroxide initiators usable include benzoyl peroxide, decanoyl peroxide, acetyl peroxide, t-butyl peroxyisobutyrate, octanoyl peroxide and succinic acid peroxide. The 10-hour half-life temperature of these polymerization initiators is within a range of preferably from 60° C. to 90° C., most preferably from 65° C. to 80° C. in view of polymerization efficiency, stability of polymerization, etc.

If a polymerization initiator having a too low half-life temperature is used, the reaction temperature becomes low and correspondingly, the reaction time becomes long, so that the molecular weight of a water-soluble resin obtained by the polymerization becomes higher than it needs, and the solubility of the acrylic resin is deteriorated to provide an acrylic resin poor in ink absorbency and image clarity. If the half-life temperature is higher than it needs on the other hand, the reaction temperature becomes higher than the reaction needs, which has a possibility that run-away of the reaction and formation of impurities more than need may be incurred.

<Polymerization Solvent>

The acrylic resin used in the resin composition for ink-jet recording media according to the present invention is obtained by dissolving the raw materials in a mixed solvent of water/alcohol, conducting a synthetic reaction by using the solvent as a polymerization solvent and then taking the reaction product as a solid by concentration or the like out of the reaction mixture. The reaction product can be further washed with a solvent or the like according to the purpose thereof for removal of remaining monomers and the like and purification.

Taking the solubility of the raw materials into consideration, water, alcohol, water-soluble ketone and mixtures thereof, and the like may be used. However, a solvent having a boiling point of 75° C. to 100° C. is preferred as the solvent in view of the polymerization reaction temperature, the molecular weight of the resin synthesized by the polymerization, polymerization reaction time, etc.

If a polymerization solvent having a too low boiling point is used, the reaction temperature becomes low and the reaction time becomes long, so that the molecular weight of a water-soluble acrylic resin synthesized by the polymerization becomes higher than it needs, and the solubility of the resin is deteriorated to provide an acrylic resin poor in ink absorbency and image clarity. If the boiling point is higher than need on the other hand, the reaction temperature becomes higher than the reaction needs, which has a possibility that run-away of the reaction and formation of impurities mote than need may be incurred. These reasons for the limitation of the boiling point are the same as the reasons for the selection of the polymerization initiator.

Accordingly, a mixed solvent of water/alcohol, particularly a mixed solvent of water and isopropyl alcohol is preferred as the polymerization solvent. The mixing ratio of the mixed solvent is 4/1 to 1/1, preferably 2/1 to 1/1, most preferably 2/1 in terms of a weight ratio of water to alcohol.

<Polymerization Reaction Temperature>

The polymerization temperature for obtaining the acrylic resin used in the resin composition for ink-jet recording media according to the present invention is suitably selected according to the reaction activity of the monomers, the kinds of the solvent and polymerization initiator upon synthesis, the intended molecular weight of the resin, etc. If the temperature is too low, however, the efficiency of the polymerization reaction is lowered, and the formation of an acrylic resin having a molecular weight higher than it needs is incurred. If the temperature is too high on the other hand, it is difficult to ensure the stability upon operation and control the formation of impurities. Therefore, the polymerization temperature is preferably within a range of from 60° C. to 100° C., more preferably from 80° C. to 90° C.

<Weight Average Molecular Weight>

If the weight average molecular weight of the acrylic resin used in the resin composition for ink-jet recording media according to the present invention is lower than 2,000, the formation of an ink-receiving layer having insufficient film strength is incurred. If the molecular weight is higher than 100,000, the solubility of such an acrylic resin and the ink absorbency of an ink-receiving layer or glossy layer making use of the resin are adversely affected. Accordingly, the weight average molecular weight of the acrylic resin is preferably within a range of from 2,000 to 100,000, more preferably from 10,000 to 50,000, most preferably from 10,000 to 20,000.

(C) Preparation of Resin Composition for Ink-jet Recording Media

The resin composition for ink-jet recording media used in the formation of an ink-receiving layer in the present invention will now be described.

The resin composition for ink-jet recording media according to the present invention is in the form of a coating material comprising, a basic component, the acrylic resin synthesized and solidified by the process described above and obtained by dissolving it in a solvent. In the resin composition for ink-jet recording media according to the present invention, a pigment is preferably contained. As the pigment, is used a pigment which is generally used and insoluble or hardly soluble in water. Such pigments maybe used either singly or in any combination there of. Specific examples thereof include white inorganic pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrohalloysite, magnesium carbonate and magnesium hydroxide; organic pigments such as styrene-based plastic pigments and acrylic plastic pigments; and particles of organic resins such as polyethylene, urea resins arid melamine resins. Among the above pigments, synthetic amorphous silica and colloidal silica are particularly preferably used as white pigments in that they are excellent in the ability to dry and absorb ink-jet inks. When a pigment is contained in an ink-receiving layer, a compounding proportion of the acrylic resin to the pigment is preferably within a range of from 1:1 to 1:15, particularly from 1:2 to 1:10.

In the present invention, no particular limitation is imposed on a solvent for dissolving the acrylic resin therein so far, as it is a water-soluble solvent. However, it is only necessary to suitably select the polarity of a solvent used in view of the solubility of the acrylic resin, the stability of an acrylic resin solution prepared or a coating material making use of such a solution, the ink permeability and image clarity of a layer formed, etc. before use of the solvent. Among others, a mixed solvent of water/alcohol, particularly a mixed solvent composed.of water and isopropyl alcohol as the alcohol is preferred.

The mixing ratio of the mixed solvent is 4/1 to 1/1, preferably 2/1 to 1/1, most preferably 1/1 in terms of a weight ratio of water to alcohol.

The resin composition for ink-jet recording media according to the present invention is prepared in the form of a coating material by dissolving or dispersing the acrylic resin synthesized in the above-describe manner, and the pigment and other additives added as desired in the solvent.

In the resin composition for ink-jet recording media according to the present invention, the solid concentration of the acrylic resin is within a range of 20 to 50% by weight, preferably 30 to 50% by weight, most preferably 30 to 40% by weight in view of the strength of the resulting ink-receiving layer, miscibility with the pigment, image properties of the resulting glossy layer, such as ink permeability and image clarity, etc.

According to a preferred embodiment of the present invention, various additives may be contained in the resin composition for ink-jet recording media-according to the present invention for the purpose of further improving the properties of the resulting ink-jet recording media. Specific examples of such additives include antioxidants, ultraviolet absorbents, fluorescent brightening agents, water-proofing agents and antistatic agents.

(D) Production of Ink-jet Recording Sheet

The ink-jet recording sheet according to the present invention is produced by applying a coating material comprising the resin composition for ink-jet recording media described above to a substrate and drying the coating material to form an ink-receiving layer. As the substrate, there may be used a paper substrate obtained by using, as a main component, wood pulp, such as chemical pulp such as LBKP or NBKP, mechanical pulp such as GP, PGW, RMP, TMP, CTMP, CMP or CGP or waste paper pulp such as DIP, or synthetic fiber pulp such as polyethylene fiber, mixing various kinds of additives generally used in paper making, such as a pigment and a sizing agent, and optionally a fixing agent, a yield improver, a paper-strength improving agent, etc., and making a paper web, a paper substrate obtained by size-pressing the above paper substrate with starch, polyvinyl alcohol or the like, a paper substrate provided with an anchor-coating layer, or a coated paper web obtained by providing a coating layer on any of these paper substrates, such as art paper web, coated paper or cast coated paper. Besides, substrates obtained by providing a polyolefin resin layer on the above-described paper substrates, and plastic films, for example, films and sheets formed of polyethylene, polypropylene, polyester, nylon, rayon, polyurethane or the like, and sheets obtained by making fibers from these synthetic resins and forming the fibers may also be used.

In the ink-jet recording sheet according to the present invention, the ink-receiving layer may be of either a single-layer structure or a laminated structure that at least two layers different from each other in, for example, the content of a pigment, are laminated. In the case of the laminated structure, it is necessary to contain the acrylic resin in at least one layer thereof. As the surface form of the ink-receiving layer, the ink-receiving layer may be surface-finished into a surface of, for example, a form having gloss property that the specular glossiness is higher than 10 (hereinafter referred to as "glossy layer"), a matte-finished form or a special form subjected to embossing.

In the present invention, the ink-receiving layer can be formed in the following manner. The above-described coating material comprising the resin composition for ink-jet recording media is applied to the above-described substrate by means of any one of various coaters such as blade coater, roll coater, air-knife coater, bar coater, rod blade coater and size press. The coating weight of the coating material is preferably within a range of 5.0 to 30.0 g/m$^2$, particularly 5.0 to 20.0 g/m$^2$ in terms of solids content in the case of, for example, the single-layer structure. In the case of a two-layer structure that a first ink-receiving layer and a second ink-receiving layer are provided on the substrate, the coating weight in the first ink-receiving layer is preferably within a range of 5.0 to 30.0 g/m$^2$, particularly 5.0 to 20.0 g/m$^2$ in terms of solids content, while the coating weight in the second ink-receiving layer is preferably within a range of 5.0 to 15.0 g/m$^2$, particularly 5.0 to 10.0 g/m$^2$. If the coating weight is less than the lower limit of the above range, ink absorbency or fixing ability may not be sufficiently achieved in some cases. If the coating weight is greater than the upper limit of the above range, problems such as dusting arise, and lowering of productivity and increase of production cost are incurred.

After the formation of the ink-receiving layer by coating, a finishing treatment may be conducted by means of a calender such as a machine calender, TG calender, super calender or soft calender.

EXAMPLES

The effects of the present invention will be more clarified by showing Examples based on the present invention, and Comparative Examples.

<Preparation Process of Acrylic Resins According to the Present Invention and Comparative Examples>

Acrylic resins of their corresponding compositions shown in Tables 1 to 3 were prepared in accordance with the following solution polymerization process.

1) A 1-liter 4-necked flask was charged with a mixed solvent (polymerization solvent) of water/isopropyl alcohol, and a stirrer, a thermometer, a condenser and dropping bottle were set in the flask to heat the solvent to a polymerization reaction temperature.

2) Synthetic raw materials were mixed with and dissolved in the same solvent as that used in the step 1) together with a polymerization initiator (5% by weight based on the total weight of monomers as the raw material).

3) The solution obtained in the step 2) was continuously added dropwise to the mixed solvent in the step 1) with stirring over 2 hours. After completion of the addition, the resulting mixture was heated and stirred for additional 4 hours to conduct a reaction.

4) After completion of the reaction, the reaction mixture was distilled under reduced.pressure to remove the polymerization solvent, thereby obtaining an acrylic resin as a solid resin.

The respective acrylic resins obtained in the step 4) were used to obtain solutions of the acrylic resins. The solvents used in the dissolution and solid concentrations of the solutions were as shown in Tables 1 to 3. Incidentally, the-ratio of monomer components in Tables 1 to 3, i.e., copolymerization ratio, was found by comparing peak intensities of substituent groups by an $^1$H-Fourier transform nuclear magnetic resonance spectrum of each acrylic resin, and confirming completion of the copolymerization reaction by disappearance of absorption derived from a double.bond at about 1,700 $cm^{-1}$ in a Fourier transform infrared absorption spectrum of the acrylic resin and then identifying absorption at about 1050, 1450 and 2800 $cm^{-1}$ for dimethylaminoethyl methacrylate, absorption in a finger-print region of longer wavelengths than 1,500 $cm^{-1}$ for methoxypolyethylene glycol methacrylate and absorption at about 700 and 3,600 $cm^{-1}$ for 2-hydroxyethyl methacrylate to compare their peak intensities with one another. The weight average molecular weight was determined by gel permeation chromatography (G PC) using THF as an eluent.

TABLE 1

Acrylic resins of Examples 1 to 5 and solutions thereof

| | Example | | | | |
|---|---|---|---|---|---|
| | 1 | 2 | 3 | 4 | 5 |
| Acrylic resin | | | | | |
| Dimethylaminoethyl methacrylate | 47.95% | 47.95% | 47.95% | 38.35% | — |
| Diethylaminoethyl methacrylate | — | — | — | — | 47.95% |
| Acrylamide | 4.1% | 4.1% | 4.1% | 4.1% | 4.1% |
| Methoxypolyethylene glycol (#1000) methacrylate * | — | 9.59% | 9.59% | 57.55% | 47.95% |
| 2-Hydroxyethyl methacrylate | 24.1% | 38.36% | — | — | — |
| 2-Hydroxyethyl acrylate | 23.85% | — | 38.36% | — | — |
| Polymerization initiator | AIBN | AIBN | AIBN | AIBN | AIBN |
| Polymerization reaction temperature | 80° C. | 80° C. | 90° C. | 80° C. | 100° C. |
| Weight average molecular weight | 15000 | 10000 | 15000 | 15000 | 20000 |
| Ratio of water/ isopropyl alcohol in mixed solvent | 1/1 | 2/1 | 3/1 | 2/1 | 2/1 |

TABLE 1-continued

Acrylic resins of Examples 1 to 5 and solutions thereof

| | Example | | | | |
|---|---|---|---|---|---|
| | 1 | 2 | 3 | 4 | 5 |
| Solution | | | | | |
| Ratio of water/ isopropyl alcohol in mixed solvent for dissolution | 1/1 | 1/1 | 2/1 | 3/1 | 4/1 |
| Solid concentration | 35% | 40% | 35% | 40% | 35% |

* #1000 means a molecular weight of about 1,000.

TABLE 2

Acrylic resins of Examples 6 to 10 and solutions thereof

| | Example | | | | |
|---|---|---|---|---|---|
| | 6 | 7 | 8 | 9 | 10 |
| Acrylic resin | | | | | |
| Dimethylaminoethyl methacrylate | 15.0% | 47.95% | 47.95% | 38.35% | — |
| Diethylaminoethyl methacrylate | — | — | — | — | 47.95% |
| Acrylamide | 5.0% | 4.1% | 4.1% | 4.1% | 4.1% |
| Methoxypolyethylene glycol (#1000) methacrylate * | 65.0% | 9.59% | 9.59% | 57.55% | 47.95% |
| 2-Hydroxyethyl methacrylate | 15.0% | 38.36% | 38.36% | — | — |
| 2-Hydroxyethyl acrylate | — | — | — | — | — |
| Polymerization initiator | AIBN | ACHN | ACHN | AIBN | AIBN |
| Polymerization reaction temperature | 80° C. | 60° C. | 60° C. | 80° C. | 80° C. |
| Weight average molecular weight | 25000 | 5000 | 8000 | 80000 | 80000 |
| Ratio of water/ isopropyl alcohol in mixed solvent | 2/1 | 2/1 | 3/1 | 2/1 | 1/1 |
| Solution | | | | | |
| Ratio of water/ isopropyl alcohol in mixed solvent for dissolution | 2/1 | 1/1 | 3/1 | 1/1 | 4/1 |
| Solid concentration | 35% | 40% | 35% | 50% | 50% |

* #1000 means a molecular weight of about 1,000.

TABLE 3

Acrylic resins of Comparative Examples 1 to 5 and solutions thereof

| | Comparative Example | | | | |
|---|---|---|---|---|---|
| | 1 | 2 | 3 | 4 | 5 |
| Acrylic resin | | | | | |
| Dimethylaminoethyl methacrylate | 80.0% | 100% | — | — | — |
| Diethylaminoethyl methacrylate | — | — | — | — | — |
| Acrylamide | 20.0% | — | 100% | — | — |
| Methoxypolyethylene glycol (#1000) methacrylate * | — | — | — | 100% | — |

TABLE 3-continued

| Acrylic resins of Comparative Examples 1 to 5 and solutions thereof | Comparative Example | | | | |
|---|---|---|---|---|---|
| | 1 | 2 | 3 | 4 | 5 |
| 2-Hydroxyethyl methacrylate | — | — | — | — | 100% |
| 2-Hydroxyethyl acrylate | — | — | — | — | — |
| Polymerization initiator | AIBN | AIBN | AIBN | AIBN | AIBN |
| Polymerization reaction temperature | 80° C. | 80° C. | 80° C. | 80° C. | 80° C. |
| Weight average molecular weight | 15000 | 15000 | 15000 | 15000 | 15000 |
| Ratio of water/ isopropyl alcohol in mixed solvent | 2/1 | 2/1 | 2/1 | 2/1 | 2/1 |
| Solution | | | | | |
| Ratio of water/ isopropyl alcohol in mixed solvent for dissolution | 1/1 | 1/1 | 1/1 | 1/1 | 1/1 |
| Solid concentration | 35% | 35% | 35% | 35% | 35% |

* #1000 means a molecular weight of about 1,000.

<Production of Ink-jet Recording Sheets for Evaluation of Various Properties>

Ink-jet recording sheets according to Examples 1 to 10 of the present invention and Comparative Examples 1 to 5 making respective use of the acrylic resins described above were each produced by using wood free paper having a basis weight of 90 g/$m^2$ as a substrate, coating one side of the substrate with coating fluids of the following respective formulations and then drying them to laminate a first ink-receiving layer and a glossy layer (subjected to a calendering treatment so as to give a 60-degree specular glossiness of 15) as a second ink-receiving layer in this order. In many case, the coating weight is 10 g/$m^2$ in terms of dry coating weight.

[Coating Fluid for the First Ink-receiving Layer]

Binder resin . . . any of the acrylic resin solutions shown in Tables 1 to 3 50 parts by weight Pigment . . . silica gel (Mizukasil P78D, trade name, product of Mizusawa Industrial Chemicals, Ltd.) 90 parts by weight

[Coating Fluid for the Second Ink-receiving Layer]

Binder resin . . . any of the acrylic resin solutions shown in Tables 1 to 3 5 parts by weight Pigment . . . colloidal silica gel (Snowtex UP, trade name, product of Nissan Chemical Industries, Ltd.) 25 parts by weight

<Evaluation of Various Properties of the Ink-jet Recording Sheets Produced>

Patterns for evaluation such as color patches and SCID images were printed by means of a commercially available ink-jet printer (PM 700C, manufactured by Seiko Epson Corporation) on the ink-jet recording sheets of Examples 1 to 10 and Comparative Examples 1 to 5 produced in the above-described manner. As a result, a good printed image was provided on all the recording sheets. Using such images, the recording sheets were evaluated as to light resistance (accelerated with a xenon lamp and a fluorescent lamp), light resistance under actual environment (sun light), strength of ink-receiving layer, strength of glossy layer, ink absorbency and water resistance in accordance with the following respective methods. The results are shown in Table 4.

Evaluation Methods:

1) Light Resistance 1 (Xenon Lamp-accelerated Test)

A xenon weatherometer (Ci-5000, manufactured by ATLAS Co.) was used to conduct an exposure test of 45 kJ/$m^2$ at a black panel temperature of 63° C., relative humidity of 50% and intensity of ultraviolet irradiation at 340 nm of 0.35 W/$m^2$.

A spectrophotometer, GRETAG SPM50 (manufactured by Gretag Macbeth Co.) was used to measure a reflection density of magenta, thereby evaluating the light resistance.

Retention of Optical Density:

A: Optical density after exposure exceeded 90% before exposure;

B: 80 to 90%;.

C: Lower than 80%.

2) Light Resistance 2 (Fluorescent Lamp-accelerated Test)

A fluorescent lamp-accelerating tester (HPUV, manufactured by ATLAS Co.) was used to conduct an exposure test by irradiation from only a cool white fluorescent lamp at about 6 W/$m^2$ (ultraviolet wavelength region of from 300 nm to 400 nm) for 100 hours.

A spectrophotometer, GRETAG SPM50 (manufactured by Gretag Macbeth Co.) was used to measure a reflection density of magenta, thereby evaluating the light resistance.

Retention of Optical Density:

A: Optical density after exposure exceeded 90% before exposure;

B: 80 to 90%;

C: Lower than 80%.

3) Light Resistance 3 (Sun Light-actual Environmental Test)

Color patches of yellow, magenta, cyan and black were left to stand for about 1 month over a glass window facing south to determine an average value of respective retentions of optical density.

Retention of Optical Density:

A: Optical density after exposure exceeded 90% before exposure;

B: 80 to 90%;.

C: Lower than 80%.

4) Strength of Ink-receiving Layer (Adhesion Property)

A cellophane tape was applied to-the coating ink-receiving layer of each of the recording sheets and then pulled off to evaluate the strength of the ink-receiving layer.

Strength of Ink-receiving Layer:

A: Far excellent from the viewpoint of actual use and would cause no problem (No attachment was observed on the cellophane tape);

B: Excellent from the viewpoint of actual use and would cause no problem (Attachment was somewhat observed, but no fracture of the ink-receiving layer was caused);

C: Poor from the viewpoint of actual use (the ink-receiving layer was fractured and peeled off).

5) Strength of Glossy Layer (Adhesion Property)

A cellophane tape.was applied to the coating glossy layer of each of the recording sheets and then pulled off to evaluate the strength of the glossy layer.

Strength of Glossy Layer:

A: Far excellent from the viewpoint of actual use and would cause no problem (No attachment was observed on the cellophane tape);

B: Excellent from the viewpoint of actual use and would cause no problem (Attachment was somewhat observed, but no fracture of the glossy layer was caused);

C: Poor from the viewpoint of actual use (the glossy layer was fractured and peeled off).

6) Ink Absorbency

Each of the recording sheets was evaluated as to color-mix bleeding and exudation at a single color portion by means of an ink-jet printer. Comparative judgment with the ink absorbency of Genuine glossy paper (Superfine Exclusive Glossy Paper, trade name; (thick) photoprinting paper) manufactured by Seiko Epson Corporation was made with the nakedeye.

Ink Absorbency:

A: Far excellent from the viewpoint of actual use and would cause no problem (Equal to or higher-than the glossy paper);

B: Excellent from the viewpoint of actual use and would cause no problem (Somewhat poorer, but no difference between SCID images was observed);

C: Poor from the viewpoint of actual use.

7) Water Resistance

Characters of yellow, magenta, cyan, red, green, blue of black were printed, and a droplet was dropped through a dropper on each characters and air-dried.

Evaluation of Water Resistance:

A: No run-off of dye was observed in any color;

B: Run-off of dye was observed in some colors, but legible;

C: Illegible.

TABLE 4

| | Light resistance 1 | Light resistance 2 | Light resistance 3 | Strength of ink-receiving layer | Strength of glossy layer | Ink absorbency | Water resistance |
|---|---|---|---|---|---|---|---|
| Ex. 1 | B | B | B | A | A | A | A |
| Ex. 2 | A | A | A | A | A | A | A |
| Ex. 3 | A | A | A | A | A | A | A |
| Ex. 4 | A | A | A | A | A | A | A |
| Ex. 5 | A | A | A | A | A | A | A |
| Ex. 6 | A | A | A | A | A | B | A |
| Ex. 7 | A | A | A | B | B | B | B |
| Ex. 8 | A | A | A | B | B | B | B |
| Ex. 9 | A | A | A | A | A | B | A |
| Ex. 10 | A | A | A | A | A | B | A |
| Comp. Ex. 1 | C | C | C | B | B | B | C |
| Comp. Ex. 2 | C | C | C | B | B | C | C |
| Comp. Ex. 3 | C | C | C | B | B | C | C |
| Comp. Ex. 4 | C | C | C | B | B | C | C |
| Comp. Ex. 5 | C | C | C | B | B | C | C |

According to Table 4, all the ink-jet recording sheets produced by respectively using the acrylic resins of Examples based on the present invention had excellent light resistance, image properties and strength, whereas the ink-jet recording sheets of Comparative Examples were poor in light resistance, image properties or strength.

INDUSTRIAL APPLICABILITY

An ink-receiving layer is formed with any one of the resin compositions for ink-jet recording media comprising the above specified acrylic resin according to the present invention, whereby an ink-jet recording sheet having a preventive effect on overall degradation by light such as detgradation of image clarity, and decrease in density or change of tone and possessing excellent weather resistance, image properties and strength that have heretofore been unable to be achieved is provided.

What is claimed is:

1. An ink-jet recording sheet comprising a substrate and as an ink-receiving layer provided on the substrate, a layer containing an acrylic resin comprising, as copolymerizable monomers, (a) a dialkylaminoalkyl methacrylate, (b) acrylamide and (c) at least one monomer selected from among an alkoxypolyethylene glycol methacrylate, a 2-hydroxyalkyl methacrylate and a 2-hydroxyalkyl acrylate, wherein the copolymerization ratios of the monomers in the acrylic resin are 30 to 60% by weight for the dialkylaminoalkyl methacrylate and 2 to 7% by weight for acrylamide.

2. The ink-jet recording sheet according to claim 1, wherein the ink-receiving layer comprises a pigment.

3. The ink-jet recording sheet according to claim 1, wherein the copolymerization ratio of the component (c) in the acrylic resin is 33 to 80% by weight, or 33 to 65% by weight when only the alkoxypolyethylene glycol methacrylate is used as the component (c), 33 to 55% by weight when only the 2-hydroxyalkyl methacrylate is used, or 33 to 55% by weight when only the 2-hydroxyalkyl acrylate is used.

4. The ink-jet recording sheet according to claim 1, wherein the dialkylaminoalkyl methacrylate is composed of at least one of dimethylaminoethyl methacrylate and diethylaminoethyl methacrylate.

5. The inkjet recording sheet according to claim 1, wherein the alkoxypolyethylene glycol methacrylate is composed of at least one selected from among methoxypolyethylene glycol methacrylate, ethoxypolyethylene glycol methacrylate and propoxypolyethylene glycol methacrylate.

6. The ink-jet recording sheet according to claim 1, wherein the 2-hydroxyalkyl methacrylate comprises 2-hydroxyethyl methacrylate.

7. The ink-jet recording sheet according to claim 1, wherein the 2-hydroxyalkyl acrylate is 2-hydroxyethyl acrylate.

8. The ink-jet recording sheet according to claim 1, wherein the weight average molecular weight of the acrylic resin is 2,000 to 100,000.

* * * * *